Patented Sept. 24, 1929

1,729,522

UNITED STATES PATENT OFFICE

PAUL SCHOLZ, OF FRANKFORT-ON-THE-MAIN, GERMANY

METHOD FOR MAKING REVERSIBLE CONCENTRATES FROM NATURAL MILKY JUICES SUCH AS LATEX

No Drawing. Application filed August 30, 1928, Serial No. 303,105, and in Germany July 11, 1927.

This invention relates to a method for making reversible concentrates from natural milky juices such as latex.

It is known to add disinfectants such as phenolic compounds, fluorides, cyanides, salicylates and the like to natural milky juices, which are to be shipped in their natural concentration, in order to prevent decomposition by bacteria. It is also known to concentrate latex to paste-like consistency before shipping, in order to obtain products, which are stable due to their small water content and sterilized by the concentration process. It was therefore not necessary to add disinfectants to these concentrates, which generally only contained additions of protective colloids for improving the stability.

According to the invention the addition of protective colloids to natural milky juices may be partially or entirely avoided, when salicylic acid or its salts and if necessary also alkaline reacting substances such as alkali-metal hydroxides are added to fresh natural milky juices such as latex before concentration, which is carried out after this addition, no coagulation taking place during the concentration. This is surprising. It is indeed known, that salicylic acid prevents latex from being decomposed by bacteria, but it is not known, that salicylic acid will also prevent the colloidal coagulation of latex, which really was to be expected during the concentration; it is therefore surprising that salicylic acid or its salts, being electrolytes, act in the same manner as protective colloids do.

The invention is therefore a considerable improvement of the art, as it enables the manufacture of absolutely neutral concentrates of latex, whereas the known concentrates of latex always reacted alkaline, soap being the protective colloid used for making them. The alkaline reaction of these concentrates was of disadvantages for the later use of these concentrates in manufacture. If it is however desired to use protective colloids in addition to salicylic acid or salicylates, one may obtain concentrates of a regulated hydrogen-ion concentration, as the salicylic acid or the salicylates prevent the formation of acids by decomposition of latex. According to the known methods this acid formation made it necessary to add alkaline reacting substances to the latex; it was however impossible to obtain exactly neutral products, as the degree of acidity of the latex dependent on the degree of decomposition was always varying.

*Examples*

1. To fresh latex are added 0.5% of a salicylate together with 0.25% of potassium hydroxide and the mixture is then concentrated.

2. 0.125% of a salicylate, 0.25% of potassium hydroxide and 0.5% of potassium soap are mixed with natural latex and the mixture is concentrated to form a paste.

The concentration of the latex may be carried out by any of the known methods such as by evaporation, centrifugalization, filtration and the like.

I claim:

1. As a new article of manufacture reversible, concentrated latex containing small amounts of salicylic acid.

2. As a new article of manufacture reversible, concentrated latex containing small amounts of salicylic acid and alkaline reacting substances.

3. As a new article of manufacture reversible, concentrated latex containing small amounts of salicylic acid and alkali-metal hydroxide.

4. As a new article of manufacture reversible, concentrated latex containing small amounts of salicylic acid, alkaline reacting substances and protective colloids.

5. As a new article of manufacture reversible, concentrated latex containing small amounts of salicylic acid, alkali-metal hydroxide and protective colloids.

6. As a new article of manufacture reversible, concentrated latex containing small amounts of salicylates.

7. As a new article of manufacture reversible, concentrated latex containing small amounts of salicylates and alkaline reacting substances.

8. As a new article of manufacture reversible, concentrated latex containing small amounts of salicylates and alkali-metal hydroxide.

9. As a new article of manufacture reversible, concentrated latex containing small amounts of salicylates, alkaline reacting substances and protective colloids.

10. As a new article of manufacture reversible concentrated latex containing small amounts of salicylates, alkali-metal hydroxide, and protective colloids.

11. A method for making reversible concentrates of latex which consists in adding small amounts of salicylic acid to natural latex and concentrating the mixture obtained.

12. A method for making reversible concentrates of latex which consists in adding small amounts of salicylic acid and alkaline reacting substances to natural latex and concentrating the mixture obtained.

13. A method for making reversible concentrates of latex which consists in adding small amounts of salicylic acid and alkali-metal hydroxide to natural latex and concentrating the mixture obtained.

14. A method for making reversible concentrates of latex which consists in adding small amounts of salicylic acid, alkaline reacting substances and protective colloids to natural latex and concentrating the mixture obtained.

15. A method for making reversible concentrates of latex which consists in adding small amounts of salicylic acid, alkali-metal hydroxide and protective colloids to natural latex and concentrating the mixture obtained.

16. A method for making reversible concentrates of latex which consists in adding small amounts of salicylates to natural latex and concentrating the mixture obtained.

17. A method for making reversible concentrates of latex which consists in adding small amounts of salicylates and alkaline reacting substances to natural latex and concentrating the mixture obtained.

18. A method for making reversible concentrates of latex which consists in adding small amounts of salicylates and alkali metals hydroxide to natural latex and concentrating the mixture obtained.

19. A method for making reversible concentrates of latex which consists in adding small amounts of salicylates, alkaline reacting substances and protective colloids to natural latex and concentrating the mixture obtained.

20. A method for making reversible concentrates of latex which consists in adding small amounts of salicylates, alkali-metal hydroxide and protective colloids to natural latex and concentrating the mixture obtained.

In testimony whereof I affix my signature.

PAUL SCHOLZ.